United States Patent [19]

Hayashi

[11] Patent Number: 5,473,614
[45] Date of Patent: Dec. 5, 1995

[54] METHOD OF RECORDING INFORMATION ON OPTICAL RECORD MEDIUM

[75] Inventor: Yasuo Hayashi, Hachioji, Japan

[73] Assignee: Olympus Optical Co., Ltd., Tokyo, Japan

[21] Appl. No.: 17,047

[22] Filed: Feb. 12, 1993

[30] Foreign Application Priority Data

Feb. 13, 1992 [JP] Japan .................... 4-026745

[51] Int. Cl.$^6$ .................................. G06F 11/00
[52] U.S. Cl. .................... 371/2.1; 371/30; 260/48
[58] Field of Search ................. 371/2.1, 30; 360/53, 360/48; 235/456; 369/275.1, 275.3

[56] References Cited

U.S. PATENT DOCUMENTS

| 3,761,903 | 9/1973 | Bird, Jr. et al. ............ 340/174.1 G |
| 4,389,681 | 6/1983 | Tanaka et al. ............. 360/27 |
| 4,852,101 | 7/1989 | Kobayashi et al. ......... 371/40 |
| 5,136,588 | 8/1992 | Ishijima .................... 371/2.1 |
| 5,247,499 | 9/1993 | Hayashi et al. ............ 369/32 |

FOREIGN PATENT DOCUMENTS 63-44368  2/1988  Japan .
212672  1/1990  Japan .

Primary Examiner—Emanuel T. Voeltz
Assistant Examiner—Craig Steven Miller
Attorney, Agent, or Firm—Stevens, Davis, Miller & Mosher

[57] ABSTRACT

In a method of recording data on an optical card having a plurality of tracks, each track consisting of a plurality of lines and a guide pattern, the data is divided into thirteen packets 1P to 13P each having thirty-four bytes, corresponding bytes in all the packets are grouped to form thirty-four divisions each having thirteen bytes, each of the bytes in respective divisions is divided into lower significant four bits and higher significant four bits to form sixty-eight frames, and all bits in respective frames are rearranged in the order of significance to form in-line interleaved bit data. The thus formed in-line interleaved bit data is recorded in a predetermined line in a predetermined track on the optical card, while the recording operation is controlled by a clock signal which is derived by optically reading the guide pattern formed in the relevant track. In this manner, the data is interleaved among the single line, and thus the recording operation can be performed at a high speed. Further, the data is recorded at a unit of the packet, so that the track can be utilized efficiently even when the data has a short length.

12 Claims, 9 Drawing Sheets

FIG_1
PRIOR ART

FIG_4
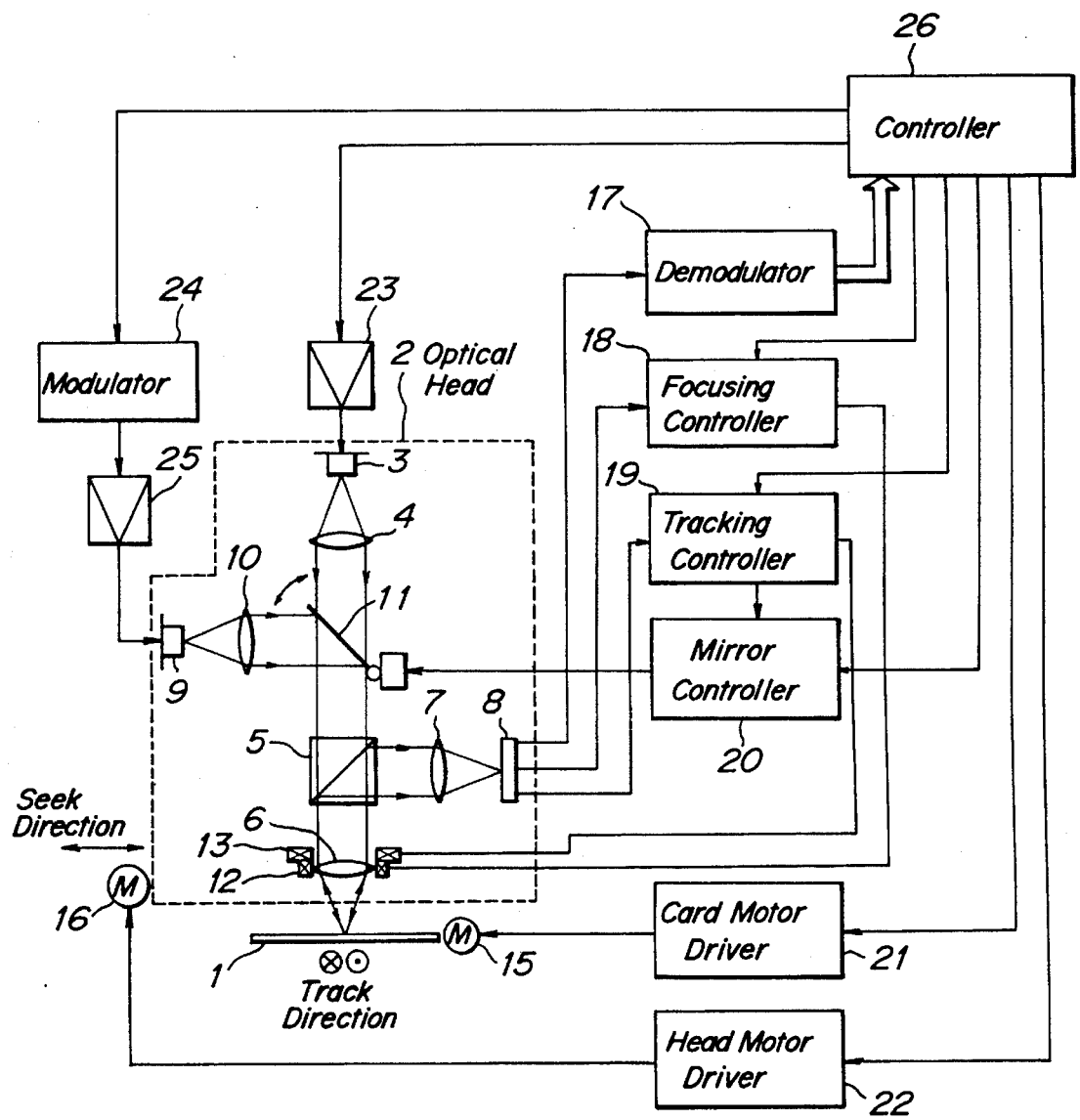

FIG.7A, FIG.7B, FIG.7C, FIG.7D, FIG.7E, FIG.7F, FIG.7G

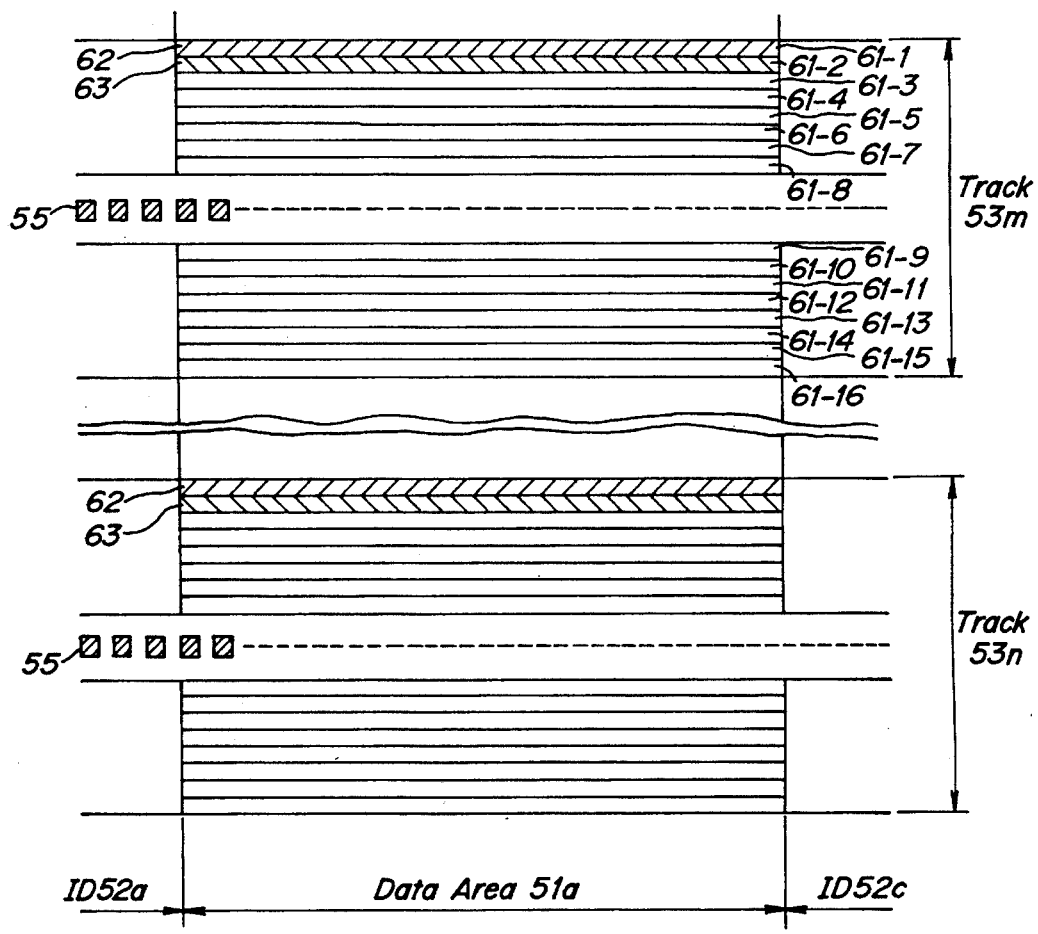
FIG_8A
FIG_8B
| Track No. | Attribute | Card ID | Insert Direction | | |
|---|---|---|---|---|---|
| | | | | | 62 | methods of recording information on optical record medium such as an optical card.

METHOD OF RECORDING INFORMATION ON OPTICAL RECORD MEDIUM

BACKGROUND OF THE INVENTION

1. Field of the Invention

The present invention relates to a method of recording information on an optical record medium such as an optical card.

2. Description of the Related Art

There have been proposed various types of optical cards. FIG. 1 shows one of known optical cards. On the optical card 1, a plurality of tracks 53 are provided in parallel with each other, and information is recorded and reproduced at a unit of track. The information is recorded and reproduced optically as a change in the optical reflectance. On the optical card 1, there are further provided ID (identification) regions 52a, 52b and 52c, in which a predetermined pattern for identifying a track and a track number are pre-recorded. The optical card 1 illustrated in FIG. 1 can be inserted into a card recording and/or reproducing apparatus in opposite directions, so that ID regions are provided not only at both ends of the tracks, but also at centers of the tracks. The track 53 further includes data regions 51a and 51b in which data has been recorded or will be recorded. That is to say, the optical card 1 is of the once-write type.

FIG. 2 is a schematic view depicting a detailed track format in an area A shown in FIG. 1. Each of the tracks 53 has a width corresponding to a sum of widths of twenty one lines, and sixteen lines are formed in a track 53 which are separated from each other equidistantly in a direction perpendicular to a track direction in which the tracks extend. Hereinafter, this direction perpendicular to the track direction is called a seek direction, because a light spot is moved in this direction during a seek operation for finding a desired track. Sixteen lines in a track are divided into two groups each of which includes eight lines. Between these two groups there is formed a guide line region 54 consisting of a series of rectangles arranged regularly.

Each of data regions 51a and 51b is divided into blocks 58 viewed in the track direction, each of which constitutes a unit block of data. Between successive blocks 58 as well as between the ID regions 52a, 52b and end blocks 58, there are formed frame identification patterns 59. During the seek operation, the optical card 1 and an optical head are moved in the seek direction relative to each other and track numbers 56-1 to 56-8 and identification patterns 57-1 to 57-8 in the ID region 52a or 52b are read out. During the reproduction, sixteen data bits in a data region 51a are simultaneously read out, so that the reproduction can be performed at a very high speed.

In Japanese Patent Application Laid-open Publication Kokai Hei 2-12672, there is proposed a known method of recording information on the above explained optical card. In this known method, an error correction is carried out in accordance with the (272, 190) majority logic decodable cycle code, and the data is recorded on the optical card 1 such that data bits are distributed among a track. In the present specification, this interleave is called an in-track interleave.

Successive steps of the known information recording method will be explained with reference to schematic views shown in FIGS. 3A to 3E.

(1) A information code (user data) is divided into 208 blocks (BL) each having 23 bytes (B) as shown in FIG. 3A.

(2) Error correction codes are added to the information code to form a code length data (packet P) having 272 bytes (34B) to form 208 packets as depicted in FIG. 3B.

(3) Corresponding bytes (1B to 34B) in each packets P are collected as shown in FIG. 3C.

(4) Each packet is divided into lower significant four bits (X L) and higher significant four bits (X H), X=1, 2, 3 (FIG. 3D).

(5) The lower and higher significant four bits are interleaved for respective frames over a whole track 53 and frame identification patterns 59 are formed between successive frames 58 as illustrated in FIG. 3E.

In this manner, all the packets 1P to 208P are interleaved among a whole track, so that the reproduction can be performed reliably. That is to say, when a part of the data recorded on the optical card 1 could not be read out correctly due to injuries, damages or stains, the original user data can be correctly reproduced.

In the known information recording method explained above, a writing laser beam emitted from a semiconductor laser has to be positioned onto successive lines in a track each time respective bits are recorded. That is to say, at first the laser beam is positioned onto a first line in the track and a least significant bit of a first byte 1B in a first packet 1P is recorded, and then the laser beam is jumped onto a second line in the relevant track and a next least significant bit of the first byte 1B in the first packet 1P is recorded, and so on. After a fourth bit counted from the least significant bit of a first byte 1B in a fourth packet 4P has been recorded on a sixteenth line, the laser beam moves onto the first line and at the same time the optical card is moved in the track direction by one bit pitch. Then, a least significant bit of a first byte 1B in a fifth packet 5P is recorded on the first line. It should be noted that the positioning of the laser beam onto respective lines requires a given time period, so that the recording time becomes very long.

Further, in the known information recording method, although an amount of data to be recorded in a single track is small, the data is interleaved in the whole track, so that the recording time could not be shortened at all. In this case, dummy bits, e.g. zero bits are allocated to vacant portions in 208 packets. In practice, important data such as card managing data is recorded in a duplicated manner. That is to say, the same managing data is recorded on two different tracks which are separated from each other by a relatively large distance. Usually the card managing data has a small data length, so that the efficiency of usage of the optical card is decreased, because the card managing data is also interleaved in the whole track.

SUMMARY OF THE INVENTION

The present invention has for its object to provide a novel and useful method of recording information on an optical record medium, in which the recording operation can be performed at a high speed.

It is another object of the invention to provide a method of recording data on an optical card having a plurality of tracks each consisting of a plurality of lines and a guide pattern, in which data having a relatively short length can be recorded efficiently.

According to the invention, a method of recording data on an optical record medium having a plurality of tracks each having a plurality of lines and having at least one guide pattern in each track, comprises the steps of:

re-arranging a bit arrangement of data to be recorded such that bits of the data are interleaved in a single line to form interleaved bit data; and recording said interleaved bit data on a predetermined line in a predetermined track of the optical record medium at a unit of one code length under the control of a clock signal which is derived by optically reading the guide pattern in the relevant track.

In a preferable embodiment of the data recording method according to the invention, said re-arranging step comprises dividing the data to be recorded on the optical record medium into a predetermined first number of packets each having a predetermined second number of bytes;

dividing each of the packets into a plurality of bytes each having a predetermined third number of bits;

re-arranging corresponding bytes in successive packets into groups to form said second number of divisions each having said first number of bytes;

dividing each of bytes in respective divisions into a lower significant bit group and a higher significant bit group, each including a half of said third number of bits;

grouping said lower and higher significant bit groups in each of said divisions into first and second frames, respectively; and re-arranging bits in each of the first and second frames in the order of the significance to form the interleaved bit data.

According to the invention, the data is interleaved over a single line in a track, so that the data can be recorded along the line while the record medium and the optical head are moved relatively in the track direction, and therefore the recording speed can be increased. In the present specification, this interleave is sometimes called an in-line interleave.

Further according to the invention, the data is recorded on the optical card such that data bits are interleaved in a signal line and are recorded on the line at a unit of the code word length, so that the optical card can be utilized efficiently although the data has a short length.

BRIEF DESCRIPTION OF THE DRAWINGS

FIG. 4 is a block diagram showing an embodiment of an optical card apparatus;

FIGS. 7A–7G are schematic views representing an embodiment of the information recording method according to the invention;

FIGS. 8A and 8B are schematic views illustrating another embodiment of the information record method according to the invention.

DESCRIPTION OF THE PREFERRED EMBODIMENTS

Figure 1:
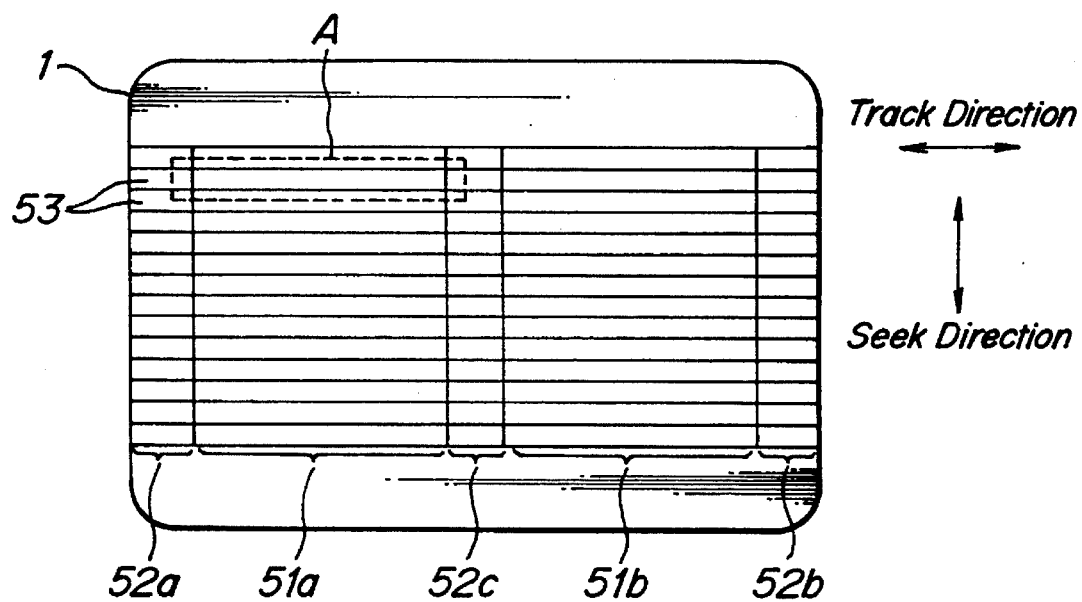
FIG. 1 is a schematic plan view showing the construction of the optical card.
Figure 2:
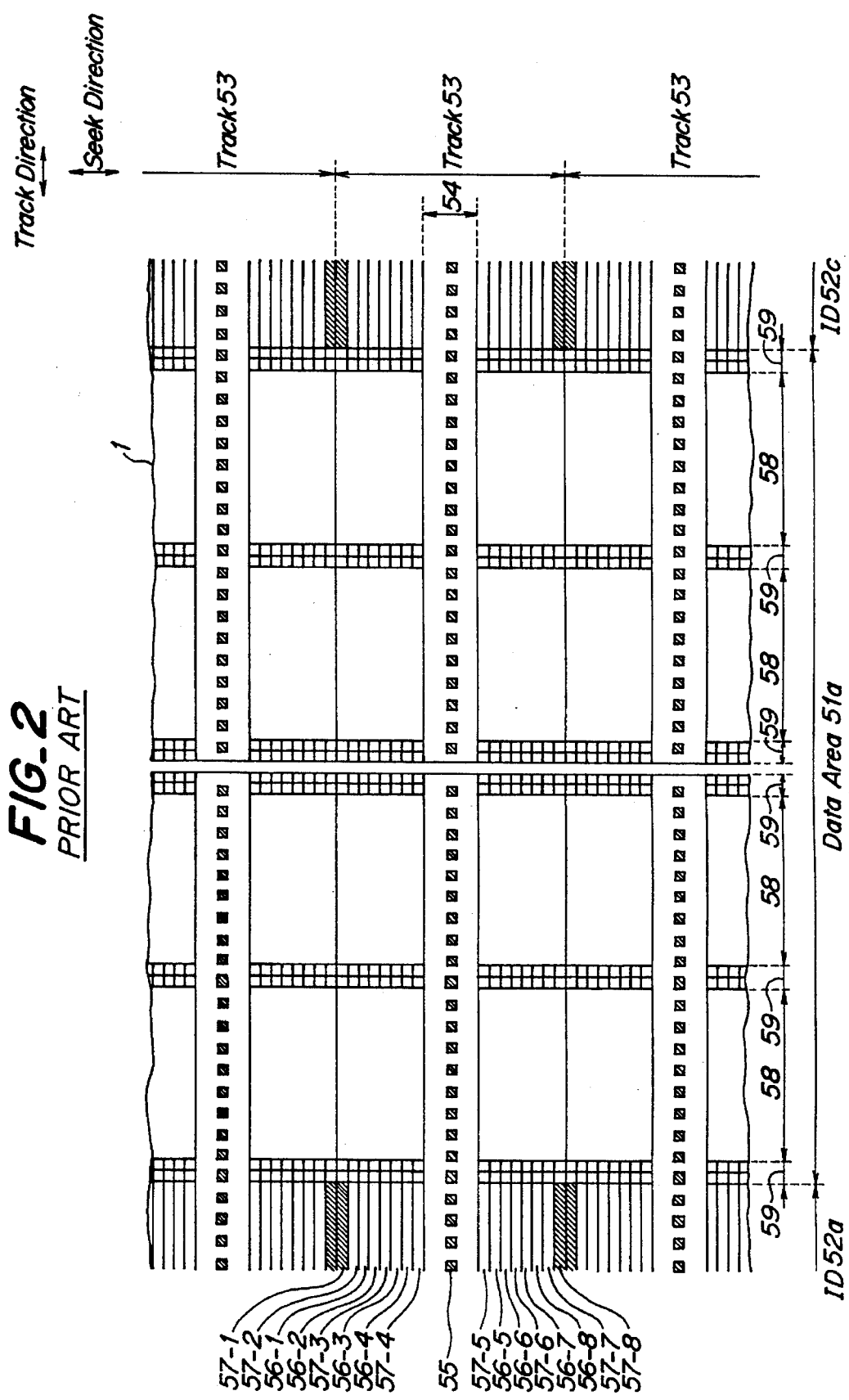
FIG. 2 is a schematic view illustrating the track construction of the optical card shown in FIG. 1.
Figure 3A:
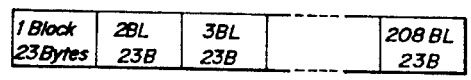
FIGS. 3A to 3E are schematic views depicting successive steps in the known method.
Figure 3B:
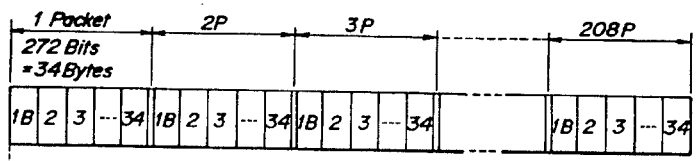
Figure 3C:
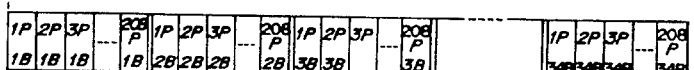
Figure 3D:
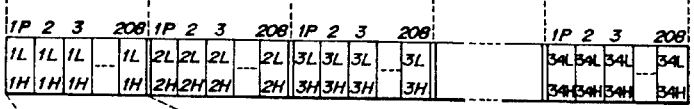
Figure 3E:
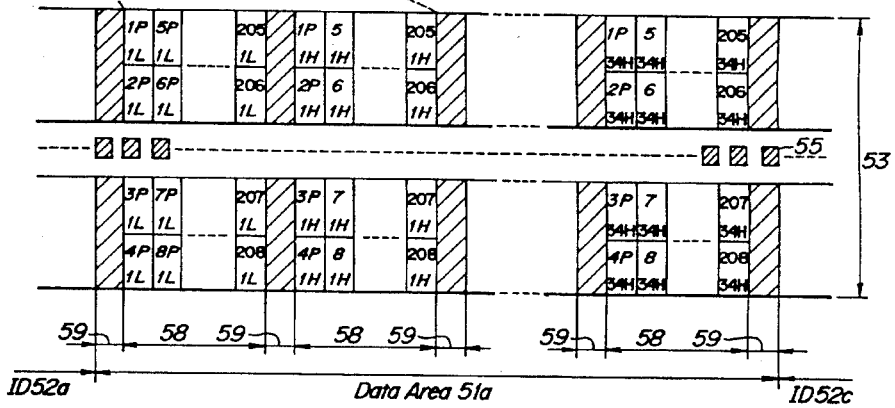

FIG. 4 is a block diagram illustrating an embodiment of an optical card recording and reading apparatus in which information is recorded on the optical card shown in FIG. 1 by the method according to the invention. The optical card 1 is driven in the track direction by means card motor driving circuit 21 and card motor 22 under the control of a controller 26. An optical head 2 is moved in the seek direction perpendicular to the track direction by means of head motor driving circuit 22 and head motor 16 under the control of the controller 26.

The optical head 2 comprises light emitting diode (LED) 3, collimator lens 4, half prism 5, objective lens 6, imaging lens 7, photodetecting device 8, semiconductor laser (LD) 9, collimator lens 10, dichroic mirror 11, focusing coil 12, trucking coil 13 and piezo-electric element 14. During the recording as well as reproducing the light emitting diode is driven by a driving circuit 23 under the control of the controller 26 and an emitted light beam is projected onto the optical card 1 by means of the collimator lens 4, dichroic mirror 11, half prism 5 and objective lens 6 to illuminate a relatively large area of the optical card. Then, an image of the thus illuminated portion of the optical card 1 is formed on the photodetecting device 8 by means of the objective lens 6, half prism 5 and imaging lens 7.

During the recording the LD 9 is driven by means of modulation circuit 24 and driving circuit 25 under the control of the controller 26 and a laser beam emitted by the LD is projected by means of the collimator lens 10, dichroic mirror 11, half prism 5 and objective lens 6 as a very fine spot within the area illuminated by the light emitted from the LED 3. Then, an optical property of a surface of the optical card 1 at a point onto which the recording laser beam is made incident is changed physically to record the data. At the same time, a light beam reflected by the optical card 1 is received by the photodetecting device 8 by means of the objective lens 6, half prism 5 and imaging lens 7. The dichroic mirror 11 is formed such that it efficiently transmits the light beam (wavelength 860 nm), but reflects the laser beam (wavelength 780 nm).

Signals produced by the photodetecting device 8 are supplied to a demodulating circuit 17 to derive a reproduced signal representing the read out data and a clock signal which is used as a reference timing signal during the recording and reproducing. These signals are supplied to the control circuit 26. A part of the reproduced signals is supplied to focusing and tracking control circuits 18 and 19 to derive focusing error correcting signal and tracking error correcting signal. The focusing and tracking error correcting signals are supplied to focusing coil 12 and a tracking coil 13, respectively to move the objective lens 6 in a focusing direction parallel with an optical axis as well as in a tracking direction perpendicular to the focusing direction and the track direction. The tracking error signal derived by the tracking control circuit 19 is also supplied to a mirror control circuit 20 in which a mirror position signal corresponding to the tracking error signal. Then the piezo-electric element 14 is driven by the mirror position signal to rotate or swing the dichroic mirror 11 such that the reading laser beam from the LD 9 is made incident upon a desired line.

Figure 5:
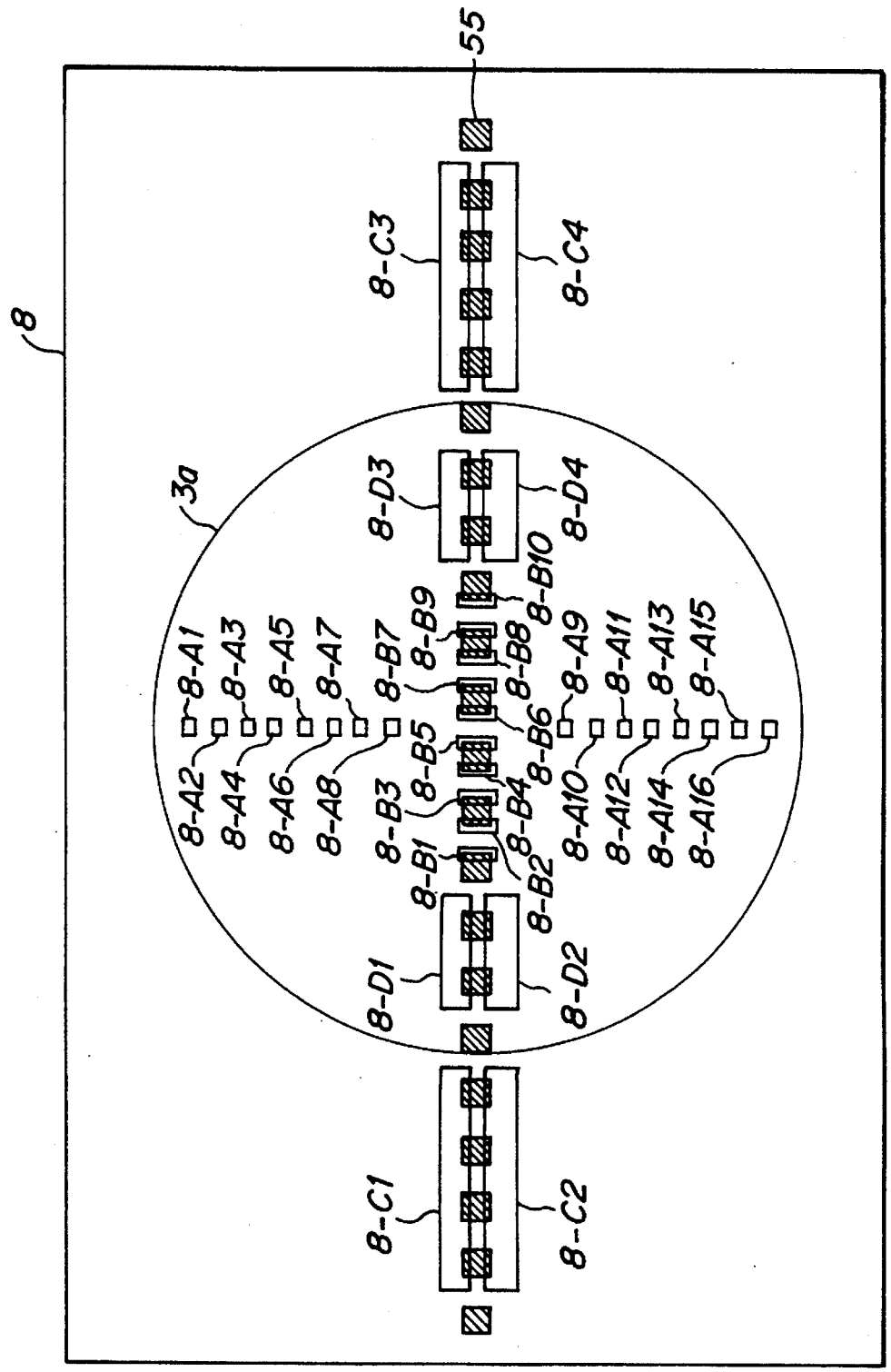
FIG. 5 is a schematic plan view depicting a photodetecting device shown in FIG. 4.

FIG. 5 is a schematic plan view showing the detailed construction of the photodetector 8 shown in FIG. 4. The photodetector 8 includes sixteen light receiving elements 8-A1 to 8-A16 aligned in the seek direction, five pairs of light receiving elements 8-B1 to 8-B10 for receiving an image of opposite edges of the guide pattern 55 viewed in the track direction to derive the clock signal, and eight pairs of light receiving elements 8-C1 to 8C-4 and 8-D1 to 8-D4 for receiving images of opposite edges of the guide pattern 55 viewed in the seek direction to produce a servo control signal.

Figure 6:
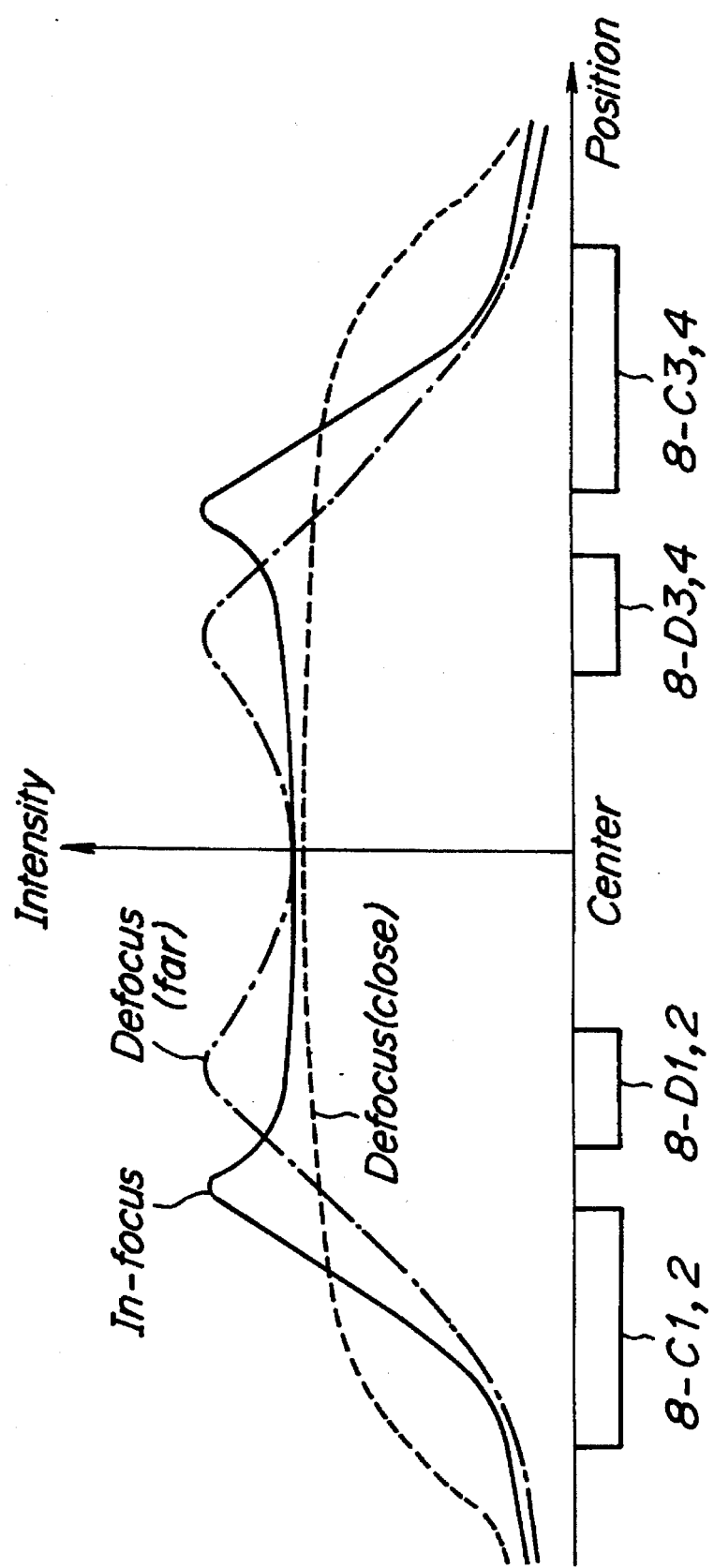
FIG. 6 is a graph showing the distribution of the intensity of light reflected by the optical card and received by the photodetecting device.

When the optical card 1 is at a focal position of the objective lens 6, the distribution of the intensity of the light reflected by the optical card and being made incident upon the photodetector 8 changes as shown by a solid line in FIG. 6. It should be noted that a circle 3a shown in FIG. 5 denotes a peak of the intensity of the light spot image in the in-focused condition represented by the solid line in FIG. 6. When the optical card 1 is moved toward the objective lens 6, the distribution curve is changed into a broken line, and when the optical card is moved away from the objective lens, the distribution is changed into a chain line. Now amounts of light beams impinging upon respective light receiving elements are denoted as follows:

- Ai (i=1 to 16): amount of light impinging upon the data reading light receiving elements 8-A1 to 8-A16
- Bj (j=1 to 10): amount of light received by the clock generating light receiving elements 8-B1 to 8-B10
- Cm (m=1 to 4): amount of light received by the outer servo signal generating light receiving elements 8-C1 to 8-C4
- Dn (n=1 to 4): amount of light received by the inner servo signal generating light receiving elements 8-D1 to 8-D4

When the optical card 1 is moved toward the objective lens 6, $\Sigma Cm$ is increased and $\Sigma Dn$ is decreased. When the optical card 1 is moved away from the objective lens 6, $\Sigma Dn$ is increased and $\Sigma Cm$ is decreased. Therefore, in the present embodiment, the focusing error signal (FE) is obtained by deriving a difference between $\Sigma Dn$ and $\Sigma Cm$. Further, the tracking error signal (TE) is obtained by deriving a difference between (D1+D3) and (D2+D4). The clock signal is produced by deriving a difference between $\Sigma Bj$ (j=1, 3, 5, 7, 9) and $\Sigma Bj$ (j=2, 4, 6, 8, 10). During the reproduction, the outputs Ai (i=1 to 16) are demodulated in synchronism with the thus derived clock signal to derive sixteen data bits simultaneously. During the recording, the writing laser beam from the LD 9 is made incident upon the optical card 1 in synchronism with the clock signal.

Now an embodiment of the information recording method according to the invention will be explained with reference to FIGS. 7A to 7E. In the present embodiment, the error correction is effected in accordance with the majority logic decodable cycle code using (272, 190) code. This error correction method has been known and has been applied to the character multiplex transmission in the television broadcasting system. An integrated circuit for this purpose may be available from OKI DENKI Company, Tokyo, Japan under a trade name of MSM6254RS. In this error correction coding system, each packet consists of an information code of 190 bits and an error correction code of 82 bits, and a logic "1" is allocated to an existence of a pit on the optical card and a logic "0" is allotted to non-existence of a pit. In other words, the logic "0" corresponds to a non-recorded bit. In the present embodiment, the following steps are performed.

Figures 7A, 7B, 7C, 7D, 7E, 7F, 7G:
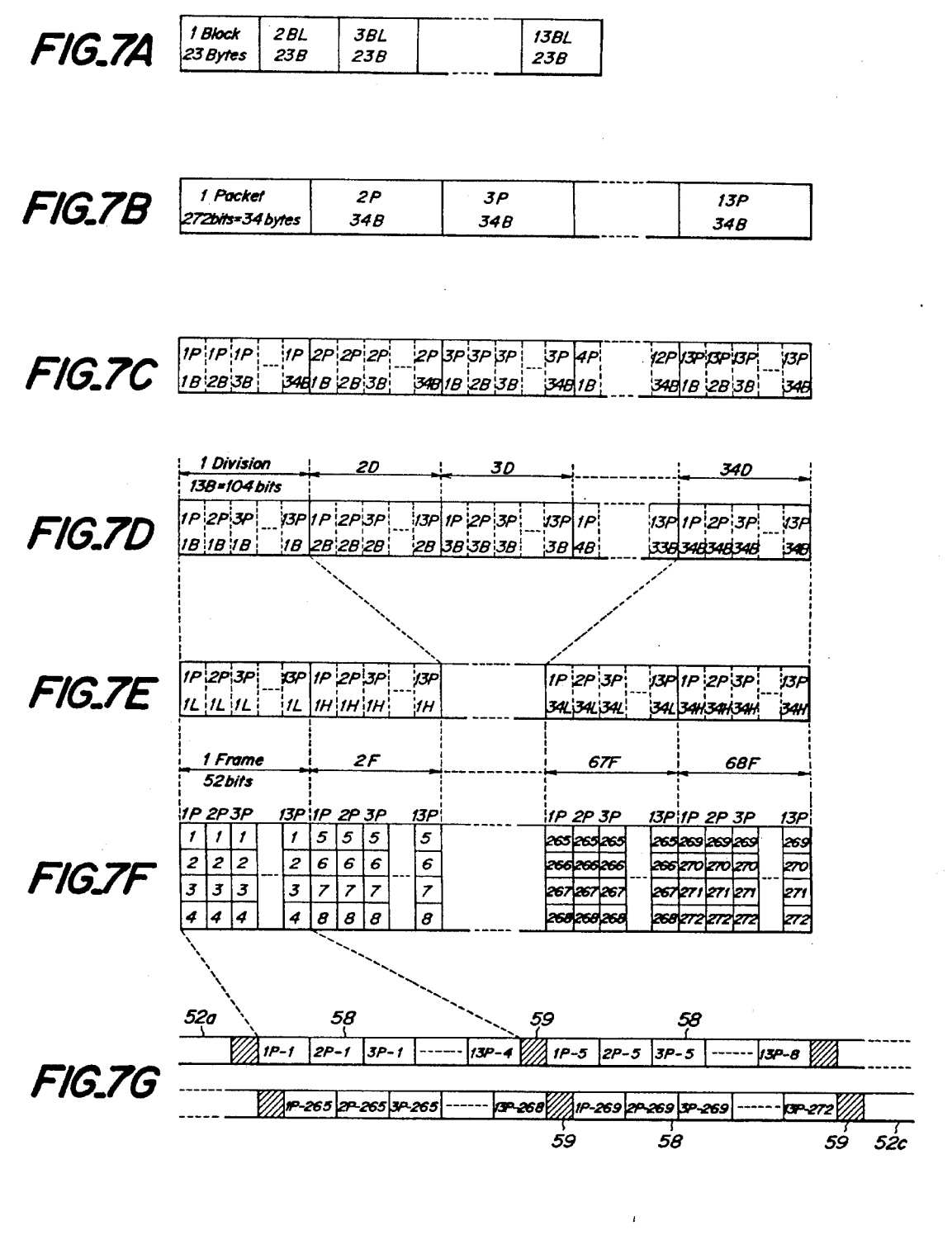

(1) Data to be recorded in a single line in a track is first divided into one or more blocks (BL) each having twenty three bytes (B) as illustrated in FIG. 7A. It is noted that a single byte consists of eight bits. The maximum number of blocks is thirteen, so that the maximum amount of data which can be recorded in a line is 23 bytes×13 blocks=299 bytes. For the time being, it is assumed that the data to be recorded has the maximum number of bytes.

(2) Then, as shown in FIG. 7B, eighty eight error correction bits are added to respective blocks to form thirteen packets P each including 34 bytes=272 bits. In the present specification, a packet is also called a single code length data. Since the number of data bits in each packet P is 184 bits (23 bytes), the remaining eight bits are formed by dummy bits of logic "0".

(3) Next, each of the packets P is divided into thirty-four bytes 1B to 34B as depicted in FIG. 7C.

(4) Corresponding bytes in all the packets 1P to 13P are grouped to form thirty-four divisions 1D to 34D as illustrated in FIG. 7D. Then, 1D=13B=104 bits. That is to say, the first division 1D consists of first bytes 1B of all the packets 1P to 13P.

(5) Each of the bytes 1B to 34B in all the divisions 1D to 34D is divided into lower significant four bits (XL:1L to 34L) and higher significant four bits (XH:1H to 34H) to form sixty eight frames 1F to 68F as shown in FIG. 7E. Therefore, each of the frames 1F to 68F consists of fifty two bits.

FIG. 7F represent the bit construction of these frames 1F to 68F, in which numerical figures denote the bit numbers of 272 bits in respective packets 1P to 13P.

(6) Finally the dichroic mirror 11 is moved into a given position by means of the mirror control circuit 20 and piezo-electric element 14 under the control of the controller 26 in accordance with the mirror position signal such that the laser beam is made incident upon the predetermined line. Then, the optical card 1 is moved in the track direction under the servo control and at the same time the intensity of the laser beam emitted from the LD 9 is modulated in accordance with the bit data of successive frames 1F to 68F in synchronism with the clock signal such an order that a first bit 1P-1 of the first packet 1P in the first frame 1F is recorded, a first bit 2P-1 of the second packet 2P in the first frame 1F is recorded, a first bit 3P-1 of the third packet 3P in the first frame 1F is recorded and so on. After a fourth bit of the thirteenth packet 13P-4 has been recorded, a frame identification pattern 59 is recorded, and then a fifth bit of the first packet 1P-5 in the second frame 2F is recorded. Next, a fifth bit of the second packet 2P-5 in the second frame 2F is recorded, a fifth bit of the third packet 3P-5 is recorded and so on. In the present embodiment, the frame pattern 59 is formed by a non-recorded area having a predetermined length.

As explained above, according to the invention, the information data is recorded on a predetermined line in a predetermined track on the optical card as a unit of the one code length, i.e. one packet under the control of the clock signal which is produced by reading the guide pattern 55. Moreover, when a distance between successive pits on the optical card is 10 μm, a length of one frame is 520 μm and in each frame, only four bits of respective packets each consisting of 272 bits are included, so that the number of error bits in the reproduced signal is decreased. Therefore, even when a single frame could not be read out correctly due to dusts, injuries or stains, the original data can be positively restored.

Next a method of reproducing the data from the optical card will be explained. In this case, the above mentioned steps for recording the data are performed in a reverse order by a microprocessor provided in the controller 26.

(1) At first, the data recorded on a predetermined line in a predetermined track is optically read out to produce a bit signal and the thus derived bit signal is temporarily stored in a buffer memory in the controller 26.

(2) Next, the bit signal in successive frames 1F to 68F is re-arranged in a manner shown in FIG. 7F. That is to say, successive bits are allocated to successive packets 1P to 13P.

(3) Then, the bit signal in successive frames 1F to 68F is re-arranged into byte data (8 bit data) to form the divisions 1D to 34D as illustrated in FIG. 7D.

(4) Next byte date of successive packets 1P to 13P distributed among all the divisions 1D to 34D is rearranged as shown in FIG. 7C.

(5) Then, the byte data is divided into the packets 1P to 13P as depicted in FIG. 7B, each of which consists of 190 bit data code and 82 bit error correction code, and the error correction is performed.

(6) After the error correction, among 190 bits in a packet six dummy bits which have been allotted to logic "0" are deleted to restore the original data of 184 bits (23 bytes) as shown in FIG. 7A.

In case of recording the data by the method according to the invention, all the tracks on the optical card may be used as the in-line interleave or a part of the tracks is used as the in-line interleave. In the latter case, the data record area on the optical card is previously divided into the in-line interleave area and the in-track interleave area. In such a case, the in-track interleave area may be used as a ROM area in which data is previously recorded and data may be additionally rewritten only in the in-line interleave area. Further, respective tracks may be used as the in-line interleave track or in-track interleave track. In other words, each track may be used as any of the in-line interleave track and in-track interleave track. In this case, it is necessary to record track managing data for identifying respective tracks. The track managing data may be recorded in a predetermined track or tracks on the optical card in various methods.

FIGS. 8A and 8B are schematic views showing an embodiment for recording the track managing data on the optical card. In the present embodiment, the track managing data shown in FIG. 8B is recorded on a given line 61-1 in a predetermined master track 53m. As shown in FIG. 8B, the track managing length is relatively small. The same track managing data is also recorded on a first line 62 in another track 53n which is sufficiently separated from the track 53a. Further, another important managing data is recorded on a second line 61-2 in the master track 53m as well as on a second line 63 in the master track 53n. In this manner, the important data such as the track managing data and card managing data is recorded on the optical card in a duplicated manner, and therefore the important data can be reproduced at a very high probability. Further, according to the invention, the data can been recorded in a unit of packet, so that the optical card can be used optimally although the data length is short.

Figure 9:
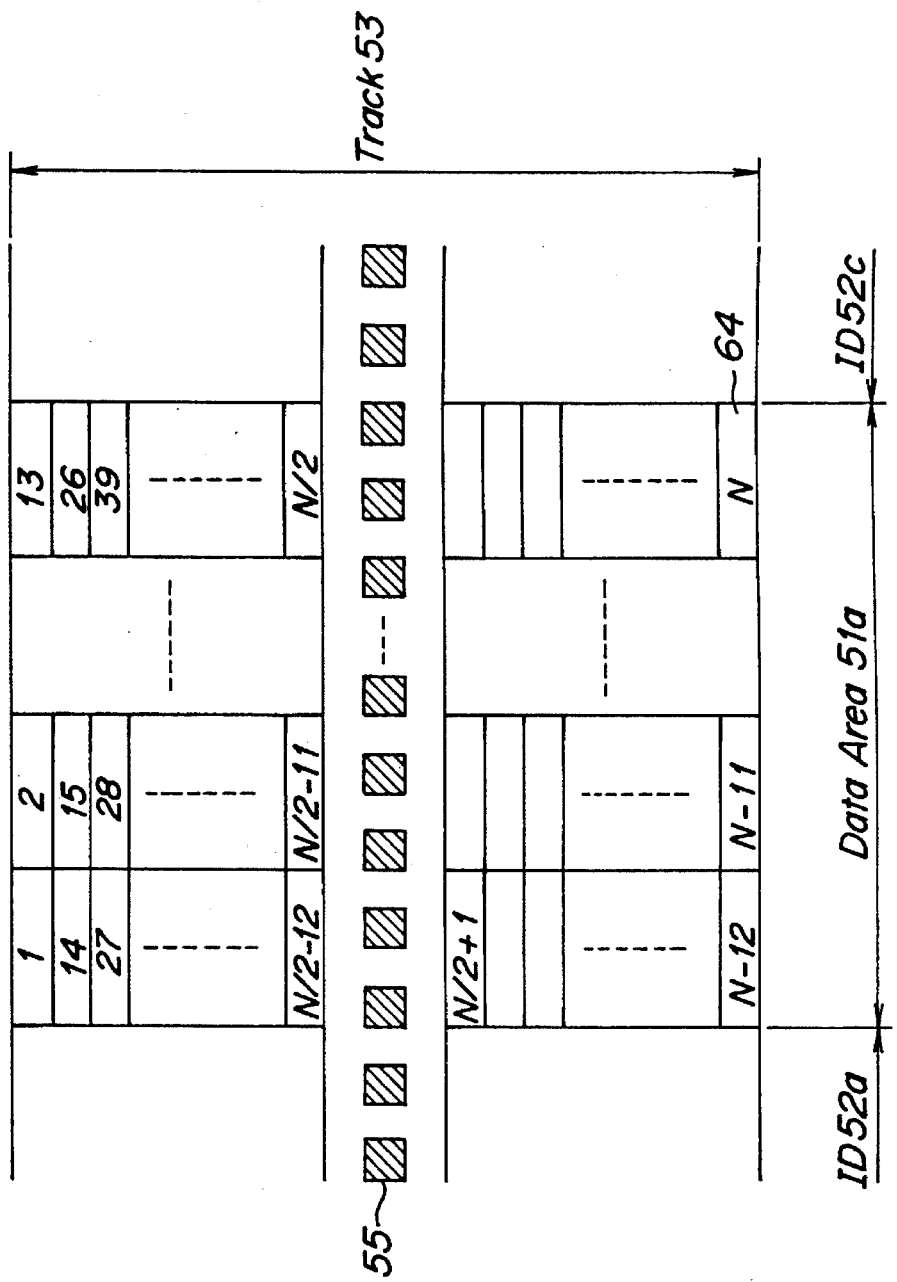
FIG. 9 is a schematic view showing still another embodiment of the information recording method according to the invention.

FIG. 9 is a schematic view illustrating another embodiment of the method for recording the track managing data. In the present embodiment, a predetermined track 53 is selected as a track managing track and respective tracks are managed by data recorded in corresponding packets 64 (1 to N). That is to say, packet numbers are allocated to respective track numbers. For instance, a first packet in a first line is allocated to a first track and necessary data for managing the relevant track is recorded in the first packet. According to the invention, the track managing data packets are also recorded in the in-line interleave method, so that the track managing data for the first track is interleaved in the first track. However, in FIG. 9, the track managing data is shown not being interleaved for the sake of simplicity. According to the invention, the data can be recorded in a unit of packet, so that the track managing data can be also recorded one by one and thus the track 53 may be utilized optimally.

According to the invention, an amount of data to be recorded on the optical card simultaneously is relatively small and thus when the data less than thirteen packets is recorded on the optical card, there are produced vacant areas in a line. According to the invention, these vacant areas may be left as they are or may be used for recording another data. If an average data length is larger than, for instance ten packets, a total amount of the vacant areas is small, so that the vacant areas may be left as they are. However, if an average data length is smaller than, for instance five packets, it is advantageous to use the vacant areas in a line for recording another data. In this case, a total amount of data recorded in a line should not exceed 23 bytes×13 blocks= 299 bytes. Further, if data to be recorded is longer than thirteen packets, the data is divided into a plurality of sections each having a length not longer than thirteen packets, and each sections is processed in the manner explained above. In this case, the data is recorded over a plurality of lines, but in each lines the in-line interleave is carried out.

In case of using the optical card as the once-write type record medium, it is necessary to record data for managing a condition of the recorded data. Usually such record managing data is recorded in a header on the optical card. In the method according to the invention, the data is recorded in a unit of packet, so that the record managing data should include track number, line number and block number. However, when vacant areas in a line are not used to record another data, it is not necessary to include the block number in the record managing data, because in such a case, it is not necessary to check up to which block in a line the data has been recorded.

As explained above in detail, in the data recording method according to the invention, the data is recorded on the optical record medium in such a manner that the data is interleaved among a line, and therefore it is no more necessary to move the writing light beam in the seek direction during the recording and the recording time can be reduced. That is to say, according to the invention, the data is recorded at a unit of one code length or packet, and thus the track can be utilized efficiently even when a small amount of data is recorded. This is particularly advantageous for recording the track managing data on the record medium in a duplicated manner. However, for this purpose it is necessary to control the recording operation by the clock signal which is generated by reading the guide pattern recorded on the record medium. Therefore, the method according to the invention could not be applied to record mediums such as the optical disk and LCS (laser card system) card in which the above mentioned clock signal could not be derived.

What is claimed is:

1. A method of recording data on a record medium having a plurality of tracks, each having a plurality of lines, and having at least one guide pattern in each of said plurality of tracks, comprising the steps of:

re-arranging a bit arrangement of said data to be recorded such that bits of the data are interleaved along a single predetermined line to form interleaved bit data; and recording said interleaved bit data on said single predetermined line in a predetermined track of the record medium at a unit of one code length under control of a clock signal which is derived by reading the guide pattern in the predetermined track and represents positional information in a direction in which said predetermined track extends.

2. A method according to claim 1, wherein said record medium is formed by an optical card and said re-arranging step comprises dividing the data to be recorded on the record medium into a predetermined first number of packets each having a predetermined second number of bytes;

dividing each of said packets into a plurality of bytes each having a predetermined third number of bits;

re-arranging corresponding ones of said bytes in successive ones of said packets into groups to form a number of divisions equal to said second number, each having a number of bytes equal to said first number;

dividing each of said bytes in said divisions into a lower significant bit group and a higher significant bit group, each including a half of said third number of bits;

grouping said lower and higher significant bit groups in each of said divisions into first and second frames, respectively; and re-arranging bits in each of the first and second frames in order of significance to form the interleaved bit data.

3. A method according to claim 2, wherein said step of dividing the data into a plurality of packets includes a step of dividing the data into said first number of blocks each having a predetermined fourth number of bytes and a step of adding a predetermined number of dummy bits to respective blocks to form said first number of packets each having said second number of bytes.

4. A method according to claim 3, wherein said fourth number of bits added to respective blocks are set to form a predetermined error correction code.

5. A method according to claim 2, wherein said step of recording the interleaved bit data includes a step of recording successive frames of the interleaved bit data and a step of recording frame identification regions between successive frames.

6. A method according to claim 5, wherein each of said frame identification regions is formed by a non-recorded area having a predetermined length.

7. A method according to claim 1, wherein said record medium is an optical record medium.

8. A method of recording data on a record medium having a plurality of tracks, each having a plurality of lines, and having at least one guide pattern in each of said plurality of tracks, comprising the steps of:

re-arranging a bit arrangement of said data to be recorded such that bits of the data are interleaved along a single predetermined line to form interleaved bit data; and recording said interleaved bit data on said single predetermined line in a predetermined track of the record medium at a unit of one code length under control of a clock signal which is derived by reading the guide pattern in the predetermined track and represents positional information in a direction in which said predetermined track extends;

wherein track managing data denoting attributes of the tracks is recorded on at least one predetermined line in an in-line interleaved manner.

9. A method according to claim 8, wherein said track managing data is recorded in a duplicated manner on a plurality of predetermined lines in a predetermined track on the optical record medium.

10. A method according to claim 8, wherein said track managing data is recorded in a duplicated manner on a plurality of predetermined lines in different tracks on the optical record medium.

11. A method according to claim 8, wherein said track managing data is recorded on a plurality of lines in a predetermined track such that track managing data for respective tracks is corresponded to said plurality of packets.

12. A method according to claim 8, wherein said record medium is an optical record medium.

* * * * *